United States Patent [19]

Murakami et al.

[11] Patent Number: 5,408,347
[45] Date of Patent: Apr. 18, 1995

[54] POLYESTER BASED LIQUID-CRYSTAL DISPLAY DEVICE

[75] Inventors: Mikio Murakami, Kakegawa; Takamasa Harada, Chiba, both of Japan

[73] Assignee: Hoechst Aktiengesellschaft, Frankfurt am Main, Germany

[21] Appl. No.: 946,375

[22] PCT Filed: Jul. 17, 1991

[86] PCT No.: PCT/EP91/01339
§ 371 Date: Jan. 12, 1993
§ 102(e) Date: Jan. 12, 1993

[87] PCT Pub. No.: WO92/01728
PCT Pub. Date: Feb. 6, 1992

[30] Foreign Application Priority Data

Jul. 18, 1990 [JP] Japan ................... 2-190144

[51] Int. Cl.$^6$ ............................................. H02H 3/26
[52] U.S. Cl. ........................................ 359/77; 528/176; 528/193; 528/194; 528/271; 528/272; 264/319; 359/78; 359/79; 359/100
[58] Field of Search ............... 528/176, 193, 194, 271, 528/272; 264/319; 359/77, 78, 79, 100

[56] References Cited

U.S. PATENT DOCUMENTS 3,884,876  5/1975  Cottis et al. ................... 528/193
4,377,681  3/1983  Deex ............................... 528/193
4,796,979  1/1989  Tsuboyama ..................... 359/77

FOREIGN PATENT DOCUMENTS 0024499   3/1981   European Pat. Off. .
0045499   2/1982   European Pat. Off. .
61-042618 3/1986   Japan .
62-299816 12/1987  Japan .
63-195602 8/1988   Japan .
01-164922 6/1989   Japan .

OTHER PUBLICATIONS

B. Bahadur (ed.), Liquid Crystals, World Scientific Publishing Co., pp. 183–185 (1990).
*Patent Abstracts of Japan* vol. 12 No. 194 (P-713) [3041] Jun. 7, 1988.

*Primary Examiner*—Samuel A. Acquah
*Attorney, Agent, or Firm*—Curtis, Morris & Safford

[57] ABSTRACT

A liquid-crystal display device having a liquid-crystal layer held between a pair of substrates each having a transparent electrode and an alignment film formed successively on the inner surface, characterized in that the material of the alignment film on at least one of the opposing faces between the substrates is a polymer having recurring units (I, II and III), the recurring unit (I) being represented by formula (A),

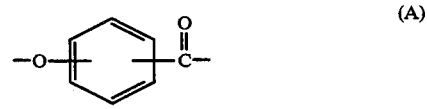
(A)

recurring unit II being a dioxyaryl portion represented by the formula —O—Ar—O— (where Ar is a divalent group having at least one aromatic ring which may contain at least one substituent selected from a $C_{1-4}$ alkyl group, a $C_{1-4}$ alkoxy group, a halogen, a phenyl and a substituted phenyl), and recurring unit (III) being a dicarboxyaryl portion represented by formula (B)

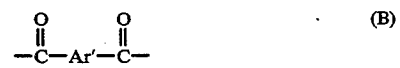

(B)

(where Ar' may be the same as or different from Ar and has the same meaning as Ar).

7 Claims, 2 Drawing Sheets

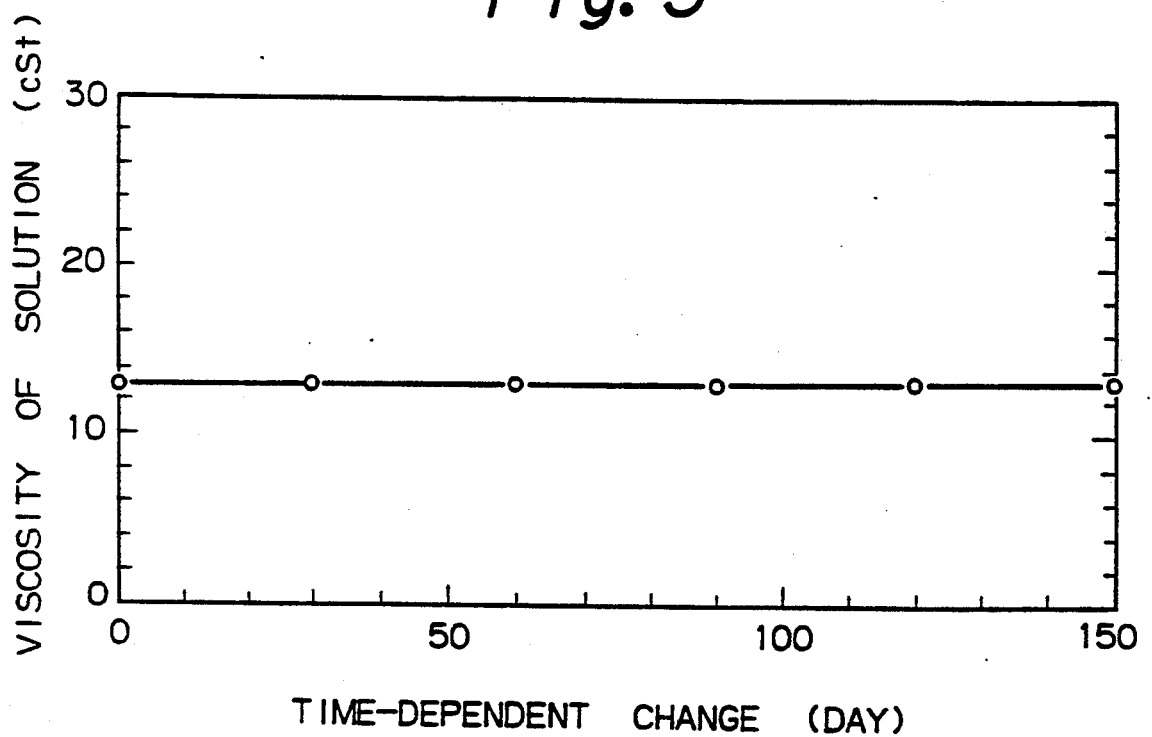

POLYESTER BASED LIQUID-CRYSTAL DISPLAY DEVICE

FIELD OF INDUSTRIAL UTILITY

The present invention relates to a liquid-crystal display device carrying alignment films that have a high capability for aligning the molecules of a liquid crystal. More particularly, the present invention relates to a liquid-crystal display device having high contrast and quality that uses a wholly aromatic polyester as the material of alignment films.

PRIOR ART

Conventional liquid-crystal alignment films are produced by a process that comprises the steps of forming a thin film of a polymer such as polyimide, polyvinyl alcohol or polyamide by a suitable method such as spin-coating, printing or dipping, curing the thin film and rubbing the cured film in one direction with a cloth or by some other suitable means. The thus produced alignment films have the ability to line up the molecules of a liquid crystal in one direction. Among the polymers mentioned above, polyvinyl alcohol is not used commercially because of its low resistance to heat and moisture. Polyimide and polyamide are commercially used in general because these polymers satisfy the following conditions:

a) to be heat-stable in both chemistry and alignment so that two substrates carrying alignment films can be heat-sealed together;
b) to have no capability to be dissolved by and to be swelled by the liquid crystal to be used;
c) to have high moisture resistance; and
d) to have a good film-forming property.

However, polyimide and polyamide have their own disadvantages as materials for alignment films. To produce polyimide films, however, polyamic acid is usually coated as a solution on a substrate and then heated to carry out a cyclizing reaction, but during heating, the applied film can develop a color to impair the appearance of the final device or the lightfastness of the alignment film. Furthermore, in order to perform a cyclizing reaction, heating to a temperature of at least 250° C. is necessary but then, plastic substrates or color filters can potentially deteriorate. In addition, polyimide usually does not have good adhesion to glass substrates and the common practice to deal with this problem has been to improve the adhesion to the substrate by using a silane coupling agent or a silane-containing diamine compound as described in Japanese Patent Publication (Kokai) No. 72924/1983. However, the use of a silane coupling agent suffers from the problem of low solution stability whereas the use of a silane-containing diamine compound is not economical since it involves the separate synthesis of a monomer. Polyamide also has the poor adhesion problem and has suffered from similar problems to polyimide. Attempts have also been made to use liquid-crystal polymers as materials for alignment films (Japanese Patent Publication (Kokai) Nos. 42818/1988 and 164922/1989). However, the polyester-based liquid-crystal polymers described in those laid-open patents have little solubility in common solvents and hence are not suitable for practical use.

SUMMARY OF THE INVENTION

An object, therefore, of the present invention is to provide a new alignment film having enhanced capability for aligning the molecules of a liquid crystal.

Another object of the present invention is to provide a liquid-crystal display device of high contrast and quality using the new alignment film.

The present invention has been accomplished on the basis of the following two findings: a polyester having the composition specified below and being soluble in common solvents has a high capability for aligning the molecules of a liquid crystal; and the polyester also has good adhesion to substrates.

The liquid-crystal display device of the present invention is characterized by using an alignment film that is formed of an aromatic polyester that comprises:

a recurring unit represented by the following formula:

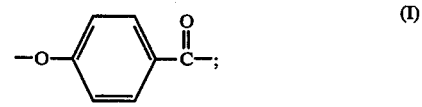

a recurring unit II which is a dioxyaryl represented by the following formula:

(where Ar is a divalent group having at least one aromatic ring which may contain at least one substituent selected from the group consisting of a $C_{1-4}$ alkyl group, a $C_{1-4}$ alkoxy group, a halogen, a phenyl and a substituted phenyl); and a recurring unit III which is a dicarboxyaryl represented by the following formula:

(where Ar' has the same meaning as Ar and may be the same as or different from Ar).

The liquid-crystal display device of the present invention uses as an alignment film a polyester comprising at least the three recurring units defined above. The polyester exhibits a liquid-crystal phase at temperatures of up to ca. 400° C., preferably up to ca. 350° C.

BRIEF DESCRIPTION OF THE DRAWINGS

FIG. 3 is a graph showing the time-dependent change in the viscosity of the polyester solution prepared in accordance with the present invention.

Figure 1:
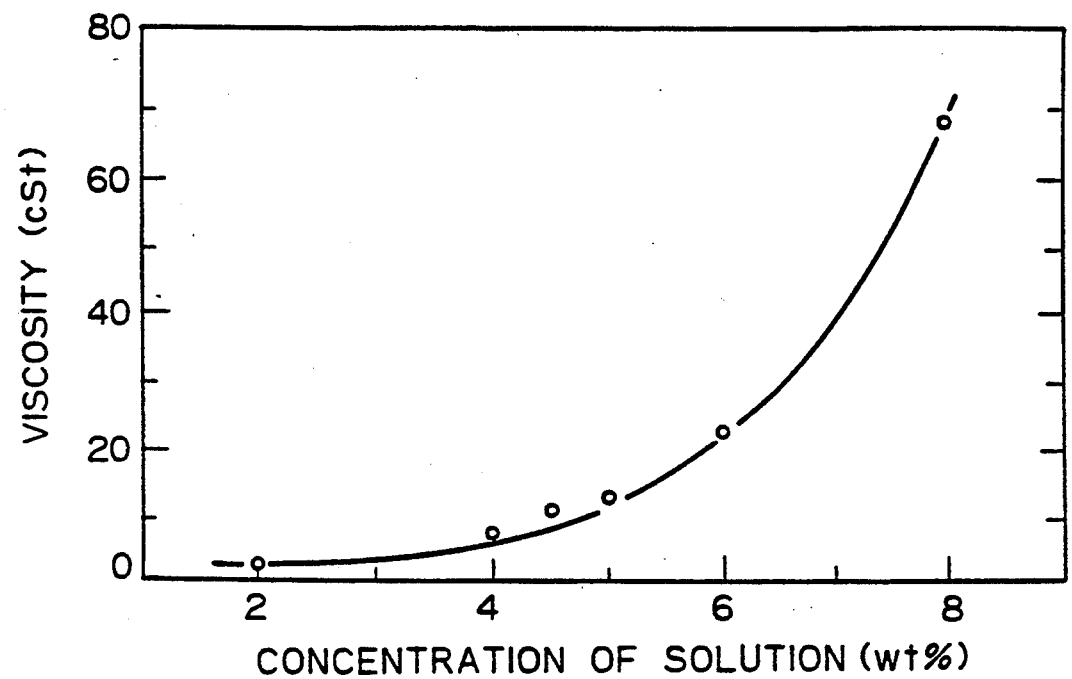
FIG. 1 is a graph showing the viscosity vs concentration profile of the polyester solution prepared in Example 1.

The first essential component (i.e. recurring unit I) of the polyester to be used in the liquid-crystal display device of the present invention is an oxybenzoyl having the following structural formula:

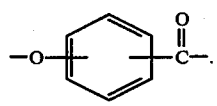

This portion is present at a concentration of 20–45% of the sum of recurring units I, II and III. The preferred recurring unit I is 4-oxybenzoyl.

The second essential portion (i.e. recurring unit II) of the polyester to be used in the present invention is a dioxyaryl portion represented by the following formula:

   II where Ar is a divalent group having at least one aromatic ring and is preferably symmetrical.

Portion II may contain a substituent for at least several hydrogen atoms on the aromatic ring, as selected from the group consisting of a $C_{1-4}$ alkyl group, a $C_{1-4}$ alkoxy group, a halogen, a phenyl, a substituted phenyl and mixtures thereof. However, in specific preferred cases, portion II does not contain cyclic substituents.

Preferred examples of the dioxyaryl portion in the polyester to be used in the liquid-crystal display device of the present invention include the following groups and mixtures thereof:

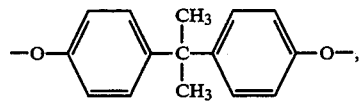

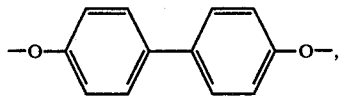

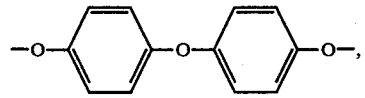

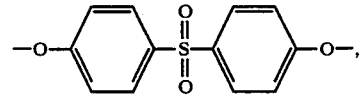

and

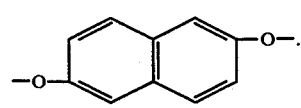

Particularly preferred examples of the dioxyaryl portion include:

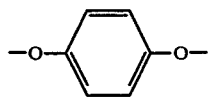

(which is derived from hydroquinone), derivatives thereof, as well as

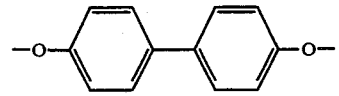

(which is derived from p,p'-biphenol), and derivatives thereof. Portion III can be derived from various ring-substituted compounds, typical examples of which include methyl hydroquinone, chlorohydroquinone and bromohydroquinone.

The third essential component (i.e. recurring unit III) of the polyester to be used in the present invention is a dicarboxyaryl portion represented by the following formula:

   III where Ar' is a divalent group comprising at least one aromatic ring. In portion III, Ar' may be

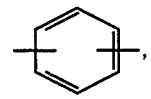, in which case the divalent linkage by which portion III is bonded to the other portions in the backbone chain of the polymer is situated in either meta or para position or in both positions.

Portion III may contain a substituent for at least several hydrogen atoms on the aromatic ring, as selected from the group consisting of a $C_{1-4}$ alkyl group, a $C_{1-4}$ alkoxy group, a halogen, a phenyl, a substituted phenyl and mixtures thereof. However, in specific preferred cases, portion III does not contain cyclic substituents.

Preferred examples of the dicarboxyaryl portion in the polyester to be used in the liquidcrystal display device of the present invention include the following groups and mixture thereof:

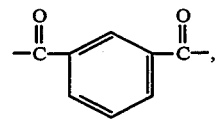

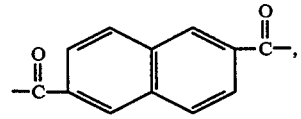

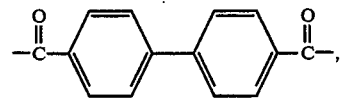

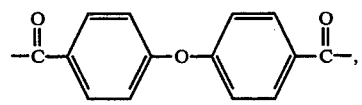

-continued

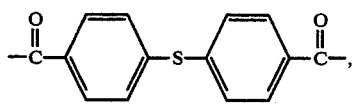

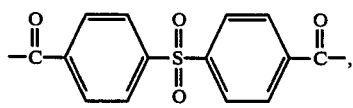

and

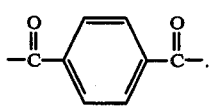

Other ester forming portions than those specified as portion I, II and III (e.g. a dioxy unit, a dicarboxy unit and/or other oxy and carboxy binding units) are additionally contained at very small concentrations in the polyester to be used in the present invention. Typical examples of such additional ester forming portions are derived from a substituted oxynaphthoic acid, m-oxybenzoic acid, a substituted oxybenzoic acid and an alicyclic dicarboxylic acid. Amide forming portions are also contained at very small concentrations in the polyester to be used in the present invention. Typical examples of reactants that can generate such amide forming portions include m-aminophenol, p-aminophenol, m-aminobenzoic acid, p-aminobenzoic acid, m-phenylenediamine and p-phenylenediamide. The additional ester forming portions and/or amide forming portions may be contained in the polyester to be used in the present invention as long as they will not raise the melting temperature of the resulting polymer beyond a predetermined level and if they will not prevent that polymer from exhibiting desired anisotropy in the melt. If such additional ester forming portions and/or amide forming portions are to be present at all, the sum of their concentrations should be small, not exceeding 10 mol % of the polymer. The polyester to be used in the present invention is preferably "wholly aromatic" in that each of the portions offers at least one aromatic ring to the backbone chain of the polymer.

Though it depends on the method of synthesis used, the polyester to be used in the liquid-crystal display device of the present invention usually has the following terminal group:

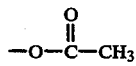

or

As will be obvious to one skilled in the art, the terminal group may be protected in a suitable manner; for example, an acidic terminal group is protected with various alcohols and a hydroxyl terminal group is protected with various organic acids. In a typical case, a terminal protecting unit such as a phenyl ester

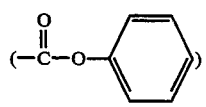

or a methyl ester

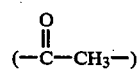

is contained at the terminal of the polymer chain. If desired, the polymer may be oxidatively crosslinked at least partially by heating in an oxygen-containing atmosphere (e.g. air), with the polymer being unpacked or in the form of a preliminarily shaped article, at a temperature not higher than its melting point for a predetermined period (e.g. several minutes). The polyester to be used in the present invention is synthesized by known methods such as the one described in U.S. Pat. No. 3,637,595.

The polyester to be used in the liquid-crystal display device of the present invention usually has an average molecular weight of ca. 2,000–200,000, preferably ca. 5,000–50,000. Molecular weight measurements can be performed by standard techniques without depolymerizing the polymer, such as by subjecting a shaped film of the polymer to infrared spectroscopy and detecting terminal groups.

The liquid-crystal display device of the present invention can be fabricated by the following procedure: dissolving a suitable polyester compound of the type described above in a suitable solvent; applying the solution onto a substrate by a suitable method such as spin coating or printing; drying the solvent at ca. 180° C.; thereafter subjecting the dried coating to a suitable treatment such as rubbing or heating with temperature gradient so as to obtain an alignment film; two of such substrates are placed parallel to each other in such a way as to provide opposite directions of alignment. By filling a liquid crystal between the two substrates, a liquid-crystal display device of high contrast and quality can be produced.

Figure 2:
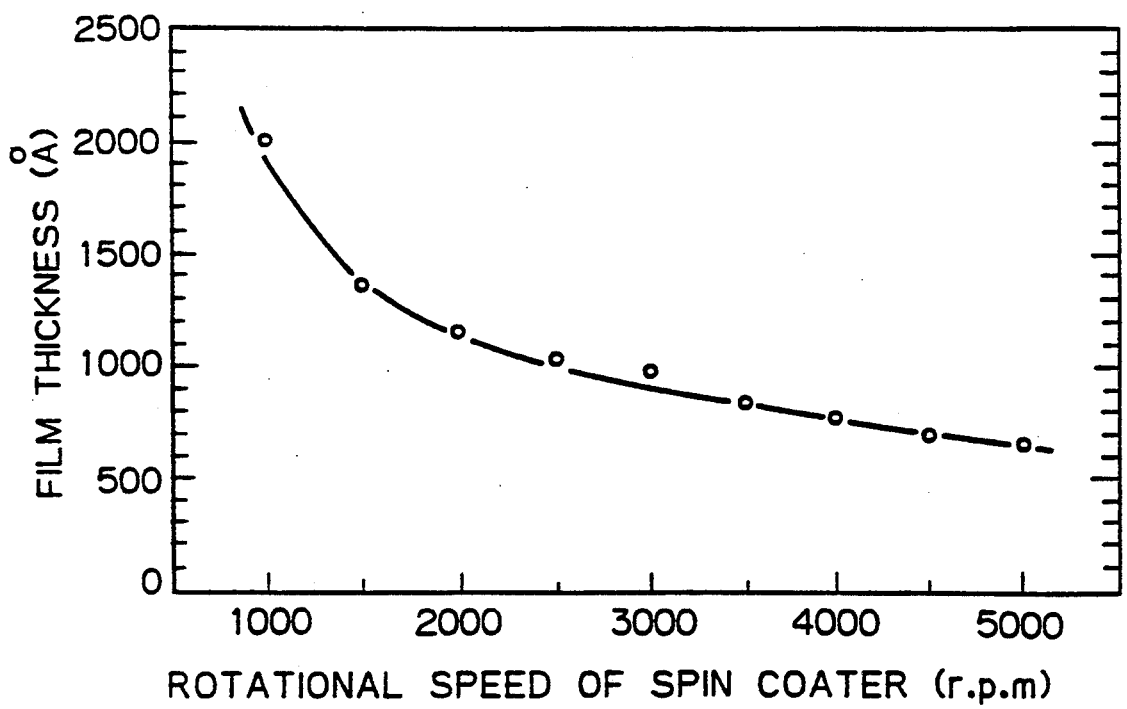
FIG. 2 is a graph showing the relationship between film thickness and the rotational speed of a spin coater.

Conventionally wholly aromatic ester polymers are only slightly soluble in organic solvents; in contrast the polyester specified by the present invention can be dissolved in N-methylpyrrolidone by heating and the resulting solution will remain stable at room temperature for a prolonged period. Hence, using this solution, desired film thicknesses can be easily obtained by a suitable method such as spln coating or printing. FIG. 1 shows the relationship between the concentration of the polyester in solution and the viscosity of its solution. FIG. 2 shows the thickness of the alignment film vs the rotational speed of a spin coater. The alignment film in the manner described above is stable even at elevated temperatures and exhibits its inherent high capability for aligning the molecules of a liquid crystal. This is probably attributable to the high heat stability of wholly aromatic crystalline polymers.

The alignment film prepared in accordance with the present invention also exhibits very good adhesion to a glass substrate, so that the film showed adhesive to the glass substrate which was comparable to films prepared from polyimide containing a silane coupling agent or a silane-containing diamine compound. Since the alignment that can be achieved by the film of the present invention is at least comparable to the prior art versions incorporating supplemental ingredients, the production cost can be reduced. A further advantage of the polyester used in the present invention is that it can be applied not only to a glass substrate but also to plastic substrates and sheets to form an alignment film at low temperatures (ca. 120° C.).

Depending on composition, the polymer to be used as the material of the alignment film In the present invention exhibits a liquid-crystal property by itself and hence will prove very effective in aligning the molecules of a liquid crystal, with pretilt angle of 2° uniformly in whole device.

Solvents that can be used to dissolve the polyester of the present invention include dimethyl sulfoxide, dimethylformamide, dimethylacetamide, N-methyl-2-pyrrolidone, butyrolactone and cyclohexanone, which may be used either alone or as admixtures.

Example 1

Isophthalic acid (0.24 mol), hydroquinone (0.24 mol) and p-hydroxybenzoic acid (0.12 mol) were subjected to polycondensation reaction. The resulting pale brown polymer was dissolved in N-methylpyrrolidone at a concentration of 4 wt % and at 150° C. The solution had a viscosity of 8 cSt (25° C). FIG. 1 shows the viscosity vs concentration profile of the solution. For application by spin coating, concentrations of ca. 3-5 wt % are desirable and, for printing, concentrations of ca. 6-7.5 wt % are desirable. The prepared 4 wt % solution was spin coated onto a glass substrate fitted with a transparent electrode for 30 sec at 3,000 rpm and thereafter fired at 180° C. to obtain an alignment film having a thickness of ca. 1,000Å. Varying thicknesses can be attained by controlling the rotational speed of spin coating. Two substrates were prepared in this way and rubbed with a nylon cloth In a given direction. They were then placed to face each other in such a way that the direction of rubbing one substrate would be antiparallel to the direction of rubbing the other substrate. With an inlet for 1 liquid crystal filling being left open, the two substrates were sealed with an epoxy resin and heated at 150° C. for 1 h. Thereafter, a nematic liquid crystal (ZLI 1565 of Merck & Co., Inc) was filled through the inlet, which was then sealed. Under examination with a polarizing microscope, the liquid crystal was found to have very good alignment with no observable domains. The pretilting angle was found to be 2.4° as measured by the magnetic field capacitance method. With ordinary twisted nematic liquid-crystal display devices, the desirable pretilting angle is said to be within the range of ca. 1.5°-3° and this condition is met by the present invention. The pretilting angle of 2.4° experienced little change even when an aging test was conducted at 70° C. and at 90% r.h. for 500 h. The alignment film was also checked for coloration and even at a film thickness of 2,000Å, the transmittance was at least 95% over the wavelength range of 400-700 nm. This was higher than the transmittance of polyimide which is currently used in liquid-crystal display devices. The alignment film was also subjected to a cross cut adhesion test and not a single square in the grid pattern of 100 cut squares was pulled off.

The results of a stability test conducted on the solution are shown in FIG. 3, from which one can see that it experienced little change in viscosity even when it was left to stand at room temperature for 3 months.

Example 2

Polycondensation reaction was performed using the same composition as in Example 1 except that the amount of addition of p-hydroxybenzoic acid was increased to 30 mol %. The resulting pale brown polymer was sub3subjected to differential scanning colorimetry (DSC) and it was found to have a melting point at 295° C., with a peak assignable to the nematic-isotropic transition point being observed at 330° C. The polymer was found to have a molecular weight of 32,000. Using this polymer, a liquid-crystal display device was fabricated as in Example 1; it exhibited very good alignment with pretilt angle of 2.1°. The alignment film also had good adhesion.

Example 3

Polycondensation reaction was performed using the same composition as in Example 1 except that the amount of addition of p-hydroxybenzoic acid was increased to 40 mol %. Using the resulting pale brown polymer, an alignment film was prepared as in Example 1 and subjected to another heat treatment at 350° C. for 1 h. No observable color change occurred. When the alignment film was assembled into a liquid-crystal display device as in Example 1, the alignment of liquid-crystal molecules was as good as in Example 1.

Example 4

Isophthalic acid (0.24 mol), 4,4'-bisphenol (0.24 mol) and p-hydroxybenzoic acid (0.12 mol) were subjected to polycondensation reaction. Using the resulting polymer, an alignment film was prepared and assembled into a liquid-crystal display device as in Example 1 except that a guest-host type liquid crystal was injected. The guest-host type liquid crystal showed a dichroic ratio of 10.5 on a polyimide alignment film but showed a dichroic ratio of 11.2 in the cell of this Example. The pretilt angle was 1.9°.

Example 5

Isophthalic acid (0.20 mol), terephthalic acid (0.04 mol), hydroquinone (0.24 mol) and p-hydroxybenzoic acid (0.12 mol) were subjected to polycondensation reaction. Using the resulting polymer, an alignment film was prepared and assembled into a liquid-crystal display device as in Example 1. Compared to the polymer prepared in Example 1, the polymer of Example 5 had a lower solubility in N-methylpyrrolidone but the alignment film had higher heat resistance. In a measurement with Perkin-Elmer TGA-7, in a nitrogen atmosphere the polymer started to undergo pyrolysis at 380° C. which was 50° C. higher than the thermal decomposition temperature of the polymer prepared in Example 1. The liquid-crystal display device using the alignment film made of this polymer had a pretilt angle of 2.2° and exhibited good alignment under observation with a polarizing microscope.

Example 6

The procedure of Example 1 was repeated except that hydroquinone was replaced by chlorohydroquinone. The mol percentages of the respective ingredients were also the same as in Example 1. As a result, a brown polymer compound was obtained. The compound had higher solubility than the polymer compound prepared In Example 1; it dissolved in an amount of ca. 8 wt % in N-methylpyrrolidone at 100° C. and the solution was very stable. Using this compound, a liquid-crystal display device was fabricated as In Example 1. It had a slightly higher pretilt angle of 3.3° and it exhibited good alignment of liquid-crystal molecules.

Example 7

Using the same composition as in Example 2, a thin film of liquid-crystalline polyester was formed on a glass substrate by the same procedure as in Example 1. The substrate with the thin polyester film was placed on hot plate having a temperature gradient of 200° C. (min. temp.) to 310° C. (max. temp.) and it was slid in a given direction at a speed of 1 cm/min. Two of such substrates were placed to face each other in such a way that the direction of sliding one substrate would be antiparallel to the direction of sliding the other substrate. Subsequently, the substrates were assembled into a liquid-crystal display device as in Example 1. The device had a pretilt angle of 1.6° and was found to exhibit good alignment under observation with a polarizing microscope.

Comparative Example 1

It was attempted to dissolve a wholly aromatic polyester based liquid-crystal polymer (VECTRA of Hoechst Celanese Corporation) showing liquid-crystal phase in N-methylpyrrolidone but it did not dissolve at all even at 180° C.

Comparative Example 2

A polyethylene terephthalate which was an aromatic polyester was dissolved at a concentration of 1 wt % in trifluoroacetic acid. Using the solution, a liquid-crystal display device was fabricated as in Example 1. However, the alignment of liquid-crystal molecules deteriorated while the sealant was heated and no satisfactory alignment was achieved.

Comparative Example 3

An aromatic polyamide having the formula shown below was dissolved in N-methylpyrrolidone and an alignment film was prepared as In Example 1:

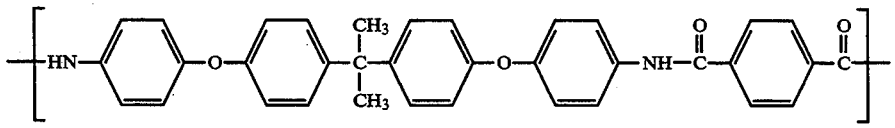

In a cross out adhesion text, 34 out of the 100 cut squares in a grid pattern were pulled off. Using the alignment film, a liquid-crystal display device was fabricated as in Example 1; it had an initial pretilt angle of 2.0° but after aging at 70° C. and at 95% r.h. for 500 h. the pretilt angle dropped to 1.0° and several domains were observed in the cell.

We claim:

1. A liquid-crystal display device having a liquid-crystal layer held between a pair of substrates each having a transparent electrode and an alignment film formed successively on the inner surface, characterized in that the material of the alignment film on at least one of the opposing faces between said substrates is a polymer having recurring units I, II and III, the recurring unit I being represented by the following formula:

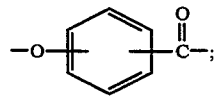

recurring unit II being a dioxyaryl portion represented by the following formula:

(where Ar is a divalent group having at least one aromatic ring which may contain at least one substituent selected from the group consisting of a $C_{1-4}$ alkyl group, a $C_{1-4}$ alkoxy group, a halogen, a phenyl and a substituted phenyl); and recurring unit III being a dicarboxyaryl portion represented by the following formula:

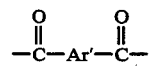

(where Ar' may be the same as or different from Ar and has the same meaning with Ar).

2. A liquid-crystal display device of claim 1 in which the recurring unit II is a divalent group derived from p-hydroquinone.

3. A liquid-crystal display device of claim 1 in which the recurring unit III is a divalent group derived from isophthalic acid.

4. A liquid-crystal display device of claim 1, in which the polyester has a molecular weight of 5,000–50,000.

5. A liquid-crystal display device of claim 1, in which the polyester is dissolved in a solvent, with the solution being then coated onto the substrate to form an alignment film.

6. A liquid-crystal display device of claim 5, wherein the solvent is n-methylpyrrolidone.

7. A liquid-crystal display device of claim 1, in which the polyester exhibits a liquid crystalline state at a temperature range of up to about 400° C.

* * * * *